United States Patent [19]
Lung

[11] Patent Number: 6,163,965
[45] Date of Patent: Dec. 26, 2000

[54] SPHERICAL CUTTER AND CUTTER HOLDER ARRANGEMENT

[75] Inventor: Kao Chin Lung, Taichung, Taiwan

[73] Assignee: Kova Carbide Tools Co., Ltd., Taichung, Taiwan

[21] Appl. No.: 09/373,025

[22] Filed: Aug. 11, 1999

[51] Int. Cl.[7] ........................................... B21K 5/12
[52] U.S. Cl. .................. 30/353; 451/557; 76/82
[58] Field of Search ................. 451/557; 76/89, 76/82, 84, 82.1, 82.2, 83, 85, 88; 30/169, 353, 165; 606/167

[56] References Cited

U.S. PATENT DOCUMENTS

| | | | |
|---|---|---|---|
| 59,770 | 11/1866 | Janh | 76/82 |
| 528,772 | 11/1894 | Dutton | 76/82 X |

*Primary Examiner*—Douglas D. Watts
*Attorney, Agent, or Firm*—Pro-Techtor International Services

[57] ABSTRACT

A spherical cutter and cutter holder arrangement, which includes a cutter holder and a spherical cutter mounted in a longitudinal mounting slot at the cutter holder and fixed thereto by a screw, wherein the spherical cutter has a first cutter layer and a second cutter layer, each cutter layer having a plurality of cutting edges spaced around the periphery, and a plurality of plane notches respectively spaced between each two adjacent cutting edges, the cutting edges of one cutter layer being respectively arranged with the plane notches of the other cutter layer at same azimuth, the cutting edges and the plane notches each having a head portion and a tail portion, the head portion and tail portion of one cutting edge of one cutter layer being respectively connected to the tail portion and head portion of one cutting edge of the other cutter layer, the head portion and tail portion of every plane notch of one cutter layer being respectively connected to the tail portion of one plane notch of the other cutter layer and the head portion of another plane notch of the other cutter layer, thereby defining a plurality of cutting mouths.

3 Claims, 6 Drawing Sheets

SPHERICAL CUTTER AND CUTTER HOLDER ARRANGEMENT

BACKGROUND OF THE INVENTION

The present invention relates to a spherical cutter and cutter holder arrangement, and more particularly to such an arrangement in which the spherical cutter has two cutter layers with multiple cutting edges and cutting mouths.

FIG. 1 shows a spherical cutter and cutter holder arrangement according to the prior art. This arrangement comprises a cutter holder A having a longitudinal mounting slot A1 at its one end, and a spherical cutter B inserted into the longitudinal mounting slot A1 at the cutter holder A and secured thereto by a screw C. The spherical cutter B has a mounting portion B2 inserted into the longitudinal mounting slot A1 at the cutter holder A, and a cutting edge B1 disposed outside the cutter holder A for cutting. Because the spherical cutter B has only one cutting edge B1, it becomes useless when the cutting edge B1 is damaged.

SUMMARY OF THE INVENTION

According to one aspect of the present invention, the spherical cutter and cutter holder arrangement comprises a cutter holder and a spherical cutter mounted in a longitudinal mounting slot at the cutter holder and fixed thereto by a screw, wherein the spherical cutter comprises a first cutter layer and a second cutter layer, each cutter layer having a plurality of cutting edges spaced around the periphery, and a plurality of plane notches respectively spaced between each two adjacent cutting edges, the cutting edges of one cutter layer being respectively arranged with the plane notches of the other cutter layer at same azimuth, the cutting edges and the plane notches each having a head portion and a tail portion, the head portion and tail portion of one cutting edge of one cutter layer being respectively connected to the tail portion and head portion of one cutting edge of the other cutter layer, the head portion and tail portion of every plane notch of one cutter layer being respectively connected to the tail portion of one plane notch of the other cutter layer and the head portion of another plane notch of the other cutter layer, thereby defining a plurality of cutting mouths. According to another aspect of the present invention, the cutter holder comprises a plurality of raised positioning portions symmetrically disposed at two opposite sides of the longitudinal mounting slot, and engaged with the plane notches at the spherical cutter to hold the spherical cutter in position. Because the spherical cutter comprises two cutter layers with multiple cutting edges and plane notches, the spherical cutter can be fastened to the cutter holder at one of a set of positions, enabling the cutting edges to be selectively exposed to the outside for cutting.

DETAILED DESCRIPTION OF THE PREFERRED EMBODIMENT

Figure 1:
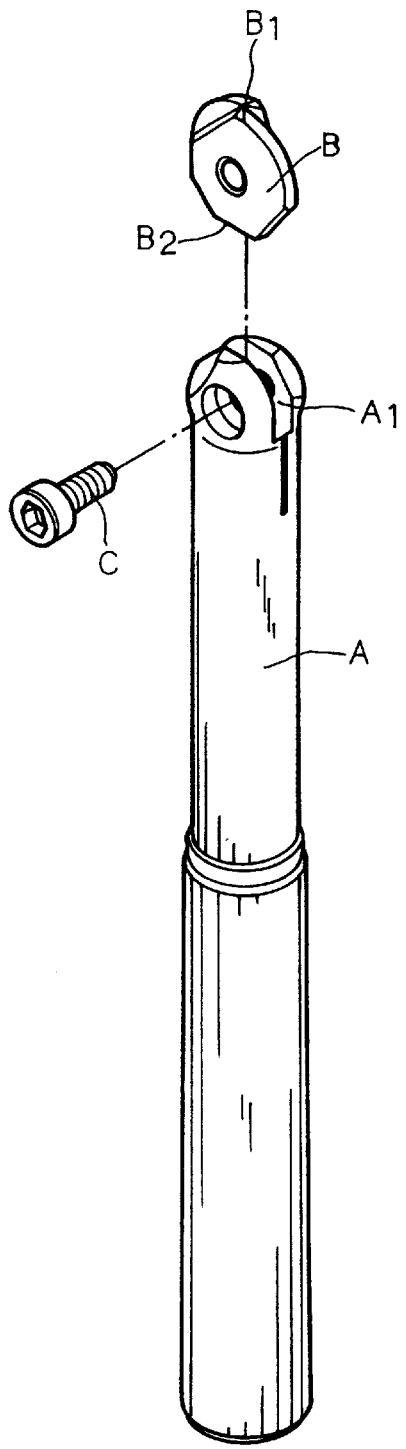
FIG. 1 is an exploded view of a spherical cutter and cutter holder arrangement according to the prior art.
Figure 2:
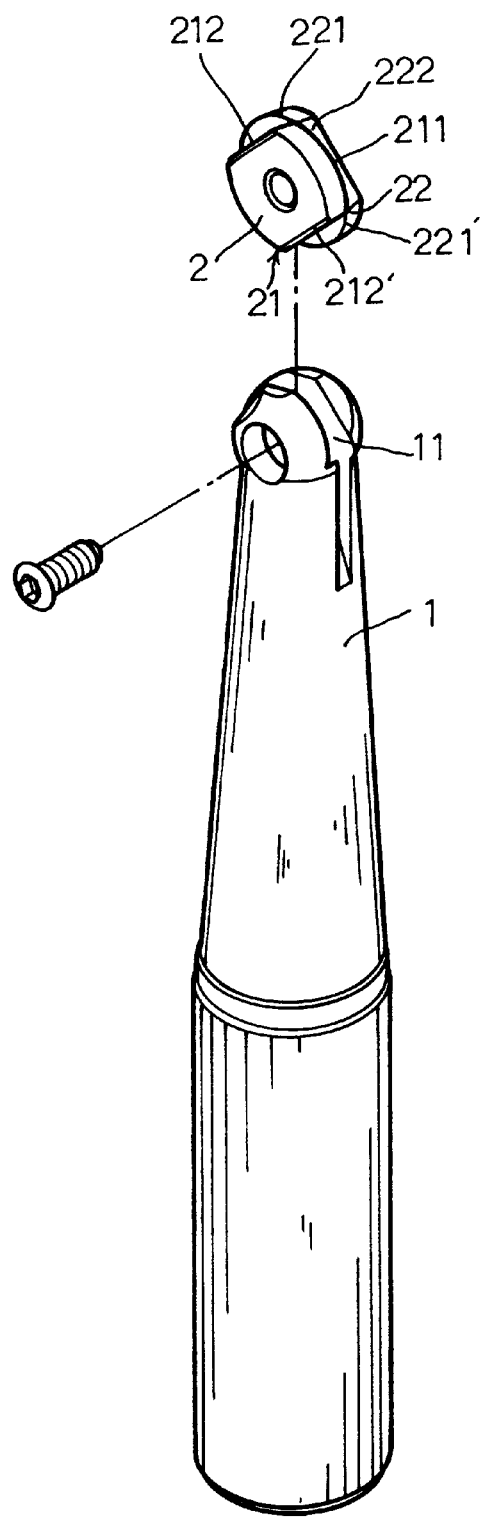
FIG. 2 is an exploded view of a spherical cutter and cutter holder arrangement according to the present invention.
Figure 3:
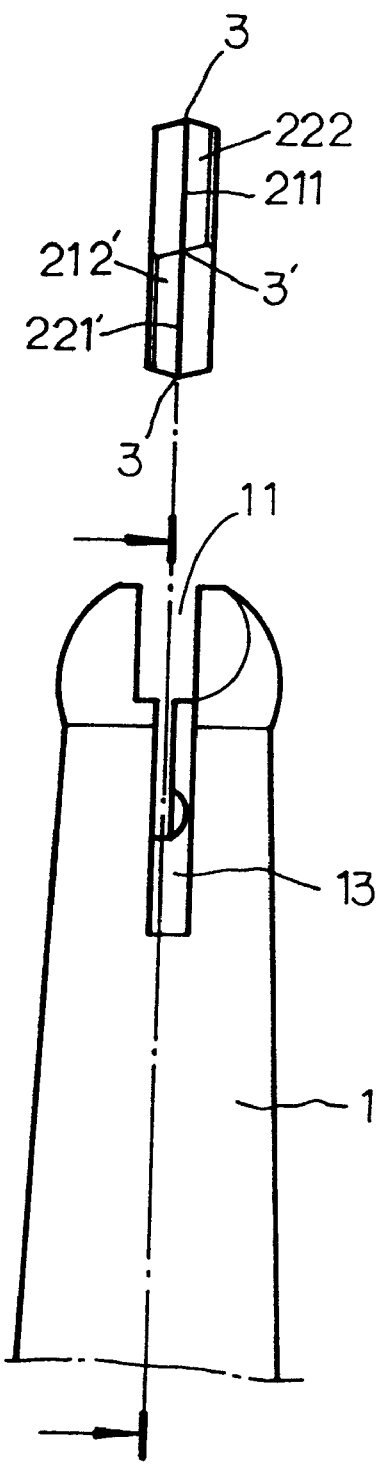
FIG. 3 is a front exploded view of the spherical cutter and cutter holder arrangement shown in FIG. 2.
Figure 4:
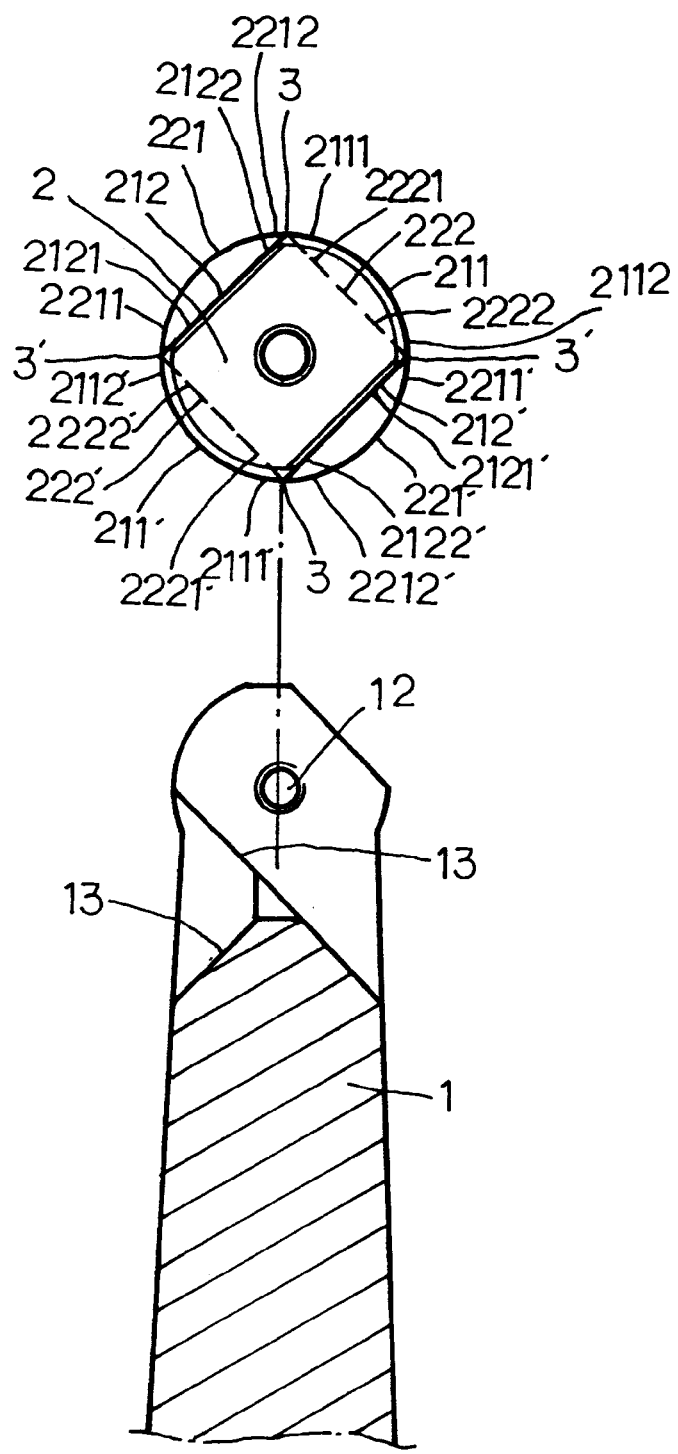
FIG. 4 is a sectional side view of FIG. 3.

Referring to FIGS. 2, 3 and 4, the present invention comprises an elongated, substantially cylindrical cutter holder 1 made for the holding of the hand, and a spherical cutter 2 fastened to one end of the cutter holder 1.

The spherical cutter 2 comprises a first cutter layer 21 and a second cutter layer 22 formed integral with each other side by side. The first cutter layer 21 and the second cutter layer 22 each comprise a plurality of cutting edges 211,211';221, 221' spaced around the periphery, and a plurality of plane notches 212,212';222,222' respectively spaced between each two adjacent cutting edges 211,211';221,221'. The cutting edges 211 or 221 of one cutter layer 21 or 22 are respectively arranged with the plane notches 221 or 212 of the other cutter layer 22 or 21 at same azimuth, such that an open space is defined in front of each cutting edge 211 or 221. The head portion 2111 or 2211 and tail portion 2112 or 2212 of one cutting edge 211 or 221 of one cutter layer 21 or 22 are respectively connected to the tail portion 2212 or 2112 and head portion 2211 or 2111 of one cutting edge 221 or 211 of the other cutter layer 22 or 21. The head portion 2121 and tail portion 2122 of every plane notch 212 of one cutter layer 21 are respectively connected to the tail portion 2222' of one plane notch 222' of the other cutter layer 22 and the head portion 2221 of another plane notch 222 of the other cutter layer 22, defining a plurality of cutting mouths 3 and 3'. When the spherical cutter 2 is set in vertical, the plane notches 212' and 222' which are disposed at the bottom side are used for positioning.

The cutter holder 1 comprises a longitudinal mounting slot 11 at its one end, a transverse screw hole 12 across the longitudinal mounting slot 11 for the mounting of a screw to secure the spherical cutter 2 to the cutter holder 1, and a plurality of raised positioning portions 13 bilaterally disposed in the longitudinal mounting slot 11 for engaging the corresponding plane notches 212' and 222' at the spherical cutter 2 to hold down the spherical cutter 2.

Figure 5:
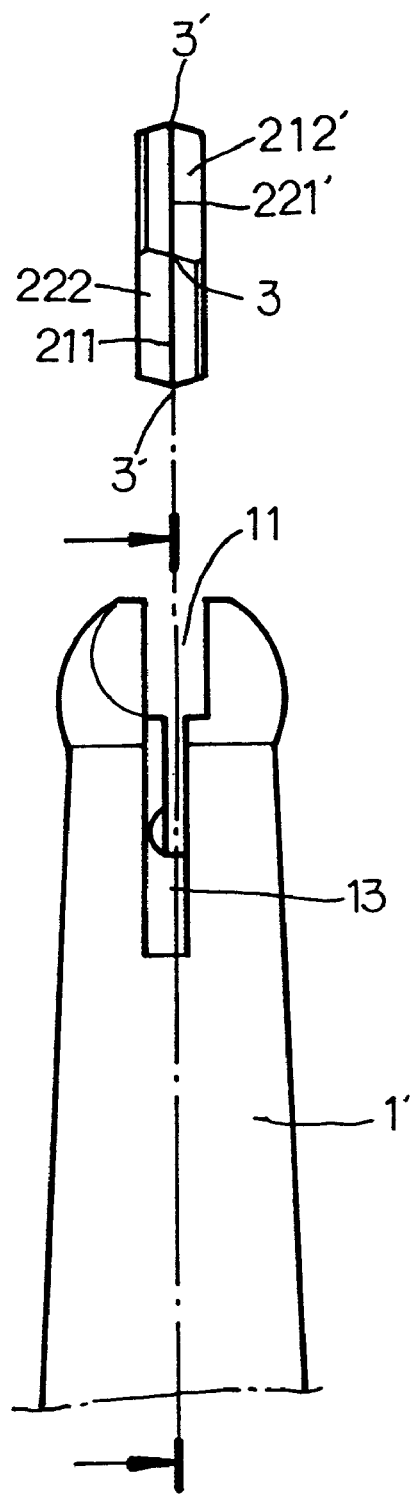
FIG. 5 is a front exploded view of an alternate form of the present invention.
Figure 6:
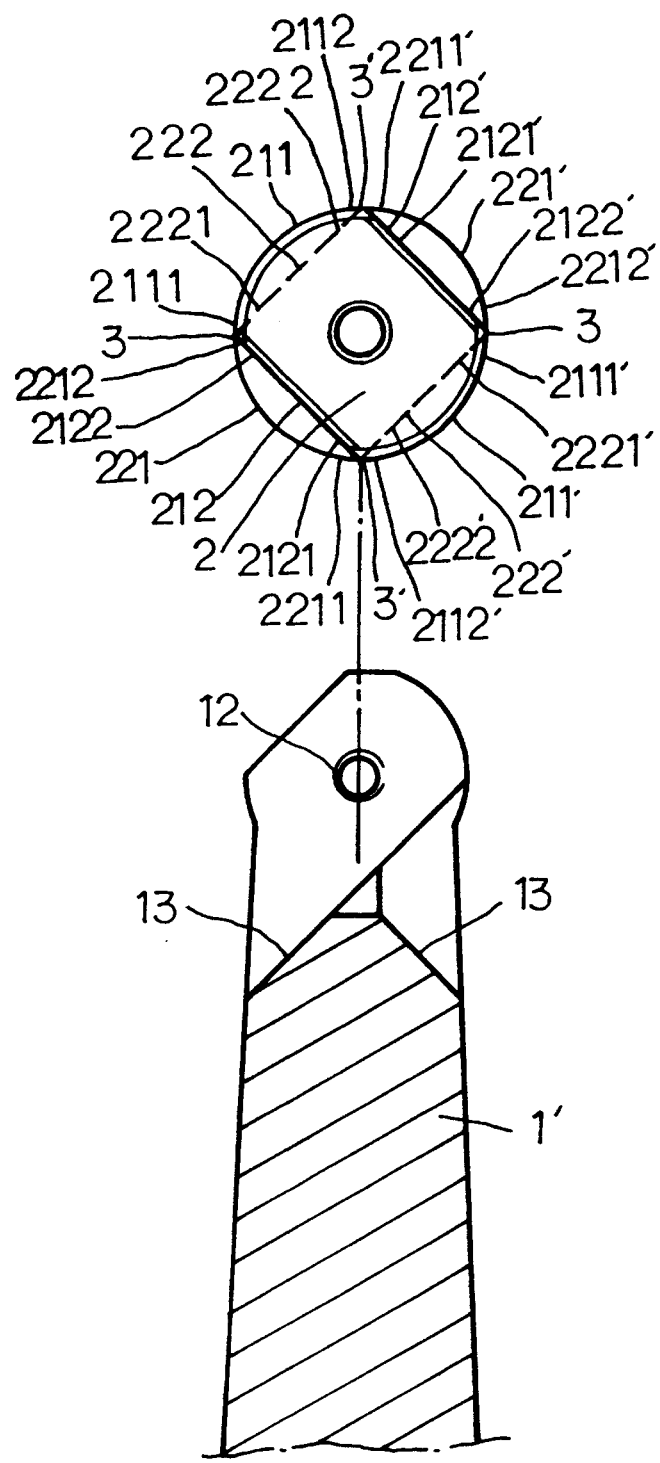
FIG. 6 is a side view in section of FIG. 5.

According to the embodiment shown in FIGS. 3 and 4, the spherical cutter 2 has four cutting mouths 3 and 3' arranged into two reversed pairs. FIGS. 5 and 6 show an alternate form of the present invention. This alternate form is similar to the embodiment shown in FIGS. 3 and 4 with the exception of the locations of the raised positioning portions 13. According to the embodiment shown in FIGS. 3 and 4 and the embodiment shown in FIGS. 5 and 6, there are two pairs of raised positioning portions 13 bilaterally disposed in the longitudinal mounting slot 11 at the cutter holder 1, and the two raised positioning portions 13 of each pair of raised positioning portions 13 are arranged across each other at a 45° slope.

It is to be understood that the drawings are designed for purposes of illustration only, and are not intended for use as a definition of the limits and scope of the invention disclosed. For example, the spherical cutter 2 can be designed having a different number of cutting mouths 3 and 3'.

What the invention claimed is:

1. A spherical cutter and cutter holder arrangement comprising a cutter holder (1), said cutter holder (1) comprising a longitudinal mounting slot (11) at one end thereof, and a transverse screw hole (12) across said longitudinal mounting slot (11), and a spherical cutter (2) inserted into the longitudinal mounting slot (11) at said cutter holder (1) and fixedly secured to said transverse screw hole (12), wherein said spherical cutter (2) comprises a first cutter layer (21) and a second cutter layer (22) formed integral with each other side by side, said first cutter layer (21) and said second cutter layer (22) each comprising a plurality of cutting edges (211,211';221,221') spaced around the periphery thereof, and a plurality of plane notches (212,212';222,222') respectively spaced between each two adjacent cutting edges (211, 211';221,221'), the cutting edges (211;221) of one cutter layer (21;22) being respectively arranged with the plane notches (221;212) of the other cutter layer (22;21) at same azimuth, such that an open space is defined in front of each cutting edge (211;221), said cutting edges (211,211';221, 221') each having a head portion (2111;2211) and a tail portion (2112;2212), the head portion (2111;2211) and tail portion (2112;2212) of one cutting edge (211;221) of one cutter layer (21;22) being respectively connected to the tail portion (2212;2112) and head portion (2211;2111) of one cutting edge (221;211) of the other cutter layer (22;21), said plane notches (212,212';222,222') each having a head portion (2121;2221) and a tail portion (2122;2222), the head portion (2121) and tail portion (2122) of every plane notch (212) of one cutter layer (21) being respectively connected to the tail portion (2222') of one plane notch (222') of the other cutter layer (22) and the head portion (2221) of another plane notch (222) of the other cutter layer (22), thereby defining a plurality of cutting mouths (3;3').

2. The spherical cutter and cutter holder arrangement of claim 1 wherein said cutter holder (1) comprises a plurality of raised positioning portions (13) symmetrically arranged at two opposite sides of said longitudinal mounting slot (11) and engaged with the plane notches (212';222') at said spherical cutter (2).

3. The spherical cutter and cutter holder arrangement of claim 2 wherein said raised positioning portions (13) are arranged in pairs, the two raised positioning portions (13) of the same pair being arranged across each other at a 45° slope.

* * * * *